US012251795B2

(12) United States Patent
Hu

(10) Patent No.: US 12,251,795 B2
(45) Date of Patent: Mar. 18, 2025

(54) RATCHET WRENCH

(71) Applicant: GONG FONG ENTERPRISE CO., LTD., Tainan (TW)

(72) Inventor: Che-I Hu, Tainan (TW)

(73) Assignee: Gong Fong Enterprise Co., Ltd., Tainan (TW)

( * ) Notice: Subject to any disclaimer, the term of this patent is extended or adjusted under 35 U.S.C. 154(b) by 382 days.

(21) Appl. No.: 18/047,440

(22) Filed: Oct. 18, 2022

(65) Prior Publication Data

US 2024/0123578 A1    Apr. 18, 2024

(51) Int. Cl.
*B25B 13/46* (2006.01)
*B25B 21/00* (2006.01)

(52) U.S. Cl.
CPC .......... *B25B 13/463* (2013.01); *B25B 21/005* (2013.01)

(58) Field of Classification Search
CPC ..... B25B 13/463; B25B 15/04; B25B 21/005; B25B 21/007
USPC .................................................... 81/57.29, 62
See application file for complete search history.

(56) References Cited

U.S. PATENT DOCUMENTS 4,128,025 A * 12/1978 Main ........................ B25B 17/00 81/63
4,448,095 A * 5/1984 Blodgett ............... B25B 13/465 81/62
5,058,463 A * 10/1991 Wannop ................ B25B 13/467 81/62
6,070,499 A * 6/2000 Wisbey ................. B25B 13/467 81/62

* cited by examiner

*Primary Examiner* — Hadi Shakeri
(74) *Attorney, Agent, or Firm* — Rosenberg, Klein & Lee

(57) ABSTRACT

A ratchet wrench comprises a grip, having a first opening, a second opening and an accommodation space, an adjustment structure being connected to the first opening, the adjustment structure including a positioning seat and a positioning member, the positioning seat having a positioning hole; a rod member, slidably disposed in the positioning hole, the rod member including a polygonal rod section and a cylindrical rod section, a through hole being defined in the rod member, an annular body being connected to the polygonal rod section, the cylindrical rod section having a first positioning portion, the polygonal rod section having a second positioning portion, the positioning member being selectively engaged with the first positioning portion or the second positioning portion to adjust a relative position of the grip and the rod member; a shaft, disposed in the through hole, the shaft being rotatable relative to the rod member.

10 Claims, 12 Drawing Sheets

RATCHET WRENCH

FIELD OF THE INVENTION

The present invention relates to a ratchet wrench, and more particularly to a ratchet wrench that can adjust the relative position of a grip and a rod member, thereby changing the use mode of the ratchet wrench.

BACKGROUND OF THE INVENTION

Taiwan Utility Model Publication No. M559224 discloses a screwdriver and a ratchet mechanism thereof, comprising: a main seat, having a first restricting portion, a second restricting portion and two spaced blocking portions; a ratchet elastic plate, having two abutting portions corresponding to the blocking portions; two pawls, one side of each pawl being blocked by a corresponding one of the blocking portions, another side of each pawl being abutted against a corresponding one of the abutting portions, each pawl being positioned between the corresponding blocking portion and the corresponding abutting portion; a toothed shaft, having a toothed portion located between the two pawls, the toothed portion being selectively meshed with or not meshed with the two pawls; a positioning elastic plate, disposed in the main seat, the positioning elastic plate having an operating portion; a ratchet direction adjusting member has two contact portions corresponding to the respective pawls, the ratchet direction adjusting member having an operated portion corresponding to the operating portion. The operated portion is driven by the operating portion for one of the contact portions to be in contact with a corresponding one of the pawls. The corresponding pawl operated by the contact portion is not meshed with the toothed portion of the toothed shaft, so as to adjust a rotation direction of the toothed portion.

Although the screwdriver combined with the ratchet mechanism as disclosed in the above-mentioned patent can control the screwdriver to rotate clockwise or counterclockwise, it cannot change the drive mode of the hand tool for different use occasions. Accordingly, the inventor of the present invention has devoted himself based on his many years of practical experiences to solve these problems.

SUMMARY OF THE INVENTION

The primary object of the present invention is to provide a ratchet wrench, comprising a grip, a rod member, and a shaft. The grip has a first opening, a second opening, and an accommodation space. An adjustment structure is connected to the first opening. The adjustment structure includes a positioning seat and a positioning member. The positioning seat has a positioning hole. The positioning hole includes a polygonal hole and a cylindrical hole communicating with the polygonal hole. A ratchet structure is connected to the second opening. The rod member is slidably disposed in the positioning hole. The rod member includes a polygonal rod section and a cylindrical rod section. A through hole is defined in the rod member. An annular body is connected to the polygonal rod section. A wrench is connected to the annular body. The wrench is rotatable relative to the annular body. The cylindrical rod section has a first positioning portion. The polygonal rod section has a second positioning portion. The positioning member is selectively engaged with the first positioning portion or the second positioning portion to adjust a relative position of the grip and the rod member. The shaft is disposed in the through hole. The shaft is rotatable relative to the rod member. One end of the shaft is provided with a gear. The gear is meshed with the wrench. Another end of the shaft is provided with a coupling member. The coupling member is engaged with the ratchet structure.

Further, the ratchet structure includes a drive base, a ratchet elastic plate, two pawls, a toothed shaft, a positioning elastic plate, and a ratchet direction adjusting member. The drive base has a first restricting portion, a second restricting portion, and two spaced blocking portions. The ratchet elastic plate has two abutting portions corresponding to the blocking portions. One side of each pawl is blocked by a corresponding one of the blocking portions. Another side of each pawl is abutted against a corresponding one of the abutting portions. Each pawl is positioned between the corresponding blocking portion and the corresponding abutting portion. The toothed shaft has a toothed portion and a coupling hole. The toothed portion is located between the two pawls. The toothed portion is selectively meshed with or not meshed with the two pawls. The coupling hole is configured to receive and secure the coupling member. The positioning elastic plate is disposed in the drive seat. The positioning elastic plate has an operating portion. The ratchet direction adjusting member has two contact portions corresponding to the respective pawls. The ratchet direction adjusting member has an operated portion corresponding to the operating portion. The operated portion is driven by the operating portion for one of the contact portions to be in contact with a corresponding one of the pawls. The corresponding pawl operated by the contact portion is not meshed with the toothed portion of the toothed shaft, so as to adjust a rotation direction of the toothed portion.

Further, the polygonal rod section has a third positioning portion. The coupling member is detachably engaged with the ratchet structure. The positioning member is selectively engaged with the first positioning portion, the second positioning portion or the third positioning portion. When the positioning member is engaged with the third positioning portion, the coupling member is disengaged from the ratchet structure.

Further, the wrench includes a toothed disk and a sleeve. The toothed plate is connected to the sleeve. The toothed disk is meshed with the gear.

Further, the adjustment structure includes an adjustment member. The adjustment member controls the positioning member to be engaged with the first positioning portion, the second positioning portion or the third positioning portion.

Further, the shaft is combined with the rod member through two retaining rings.

Further, the first restricting portion includes a first recessed space and two engaging blocks on two side walls adjacent to the first recessed space. The ratchet elastic plate has two engaging grooves corresponding to the engaging blocks on the two side walls, so as to secure the ratchet elastic plate on the first restricting portion.

Further, the second restricting portion includes a second recessed space and two blocking walls adjacent to the second recessed space. The positioning elastic plate is placed in the second recessed space. Two ends of the positioning elastic plate abut against the two blocking walls, respectively.

Further, the ratchet direction adjusting member is coupled to a rotary cover.

Further, the operating portion of the positioning elastic plate is a protrusion. The operated portion of the ratchet direction adjusting member is three notches arranged side by side.

According to the above technical features, the following effects can be achieved:

1. The positioning member is selectively engaged with the first positioning portion, the second positioning portion or the third positioning portion to adjust a relative position of the grip and the rod member, thereby controlling the drive mode of the ratchet wrench to correspond to different use occasions.
2. When the positioning member is engaged with the first positioning portion, the wrench can be driven to rotate by rotating the grip, thereby corresponding to the use occasion where it is inconvenient to swing the grip greatly.
3. When the positioning member is engaged with the second positioning portion, the wrench can be driven to rotate by swinging the grip, thereby corresponding to the use occasion where the wrench needs to be rotated rapidly.
4. When the positioning member is engaged with the third positioning portion, the coupling member can be connected to the pneumatic tool, and the pneumatic tool can drive the shaft to rotate, thereby driving the wrench to rotate, so that the wrench can be driven electrically.
5. The ratchet wrench is combined with the ratchet structure to control the forward and reverse rotation of the ratchet wrench for different use occasions.

DETAILED DESCRIPTION OF THE PREFERRED EMBODIMENTS

Embodiments of the present invention will now be described, by way of example only, with reference to the accompanying drawings.

Figure 1:
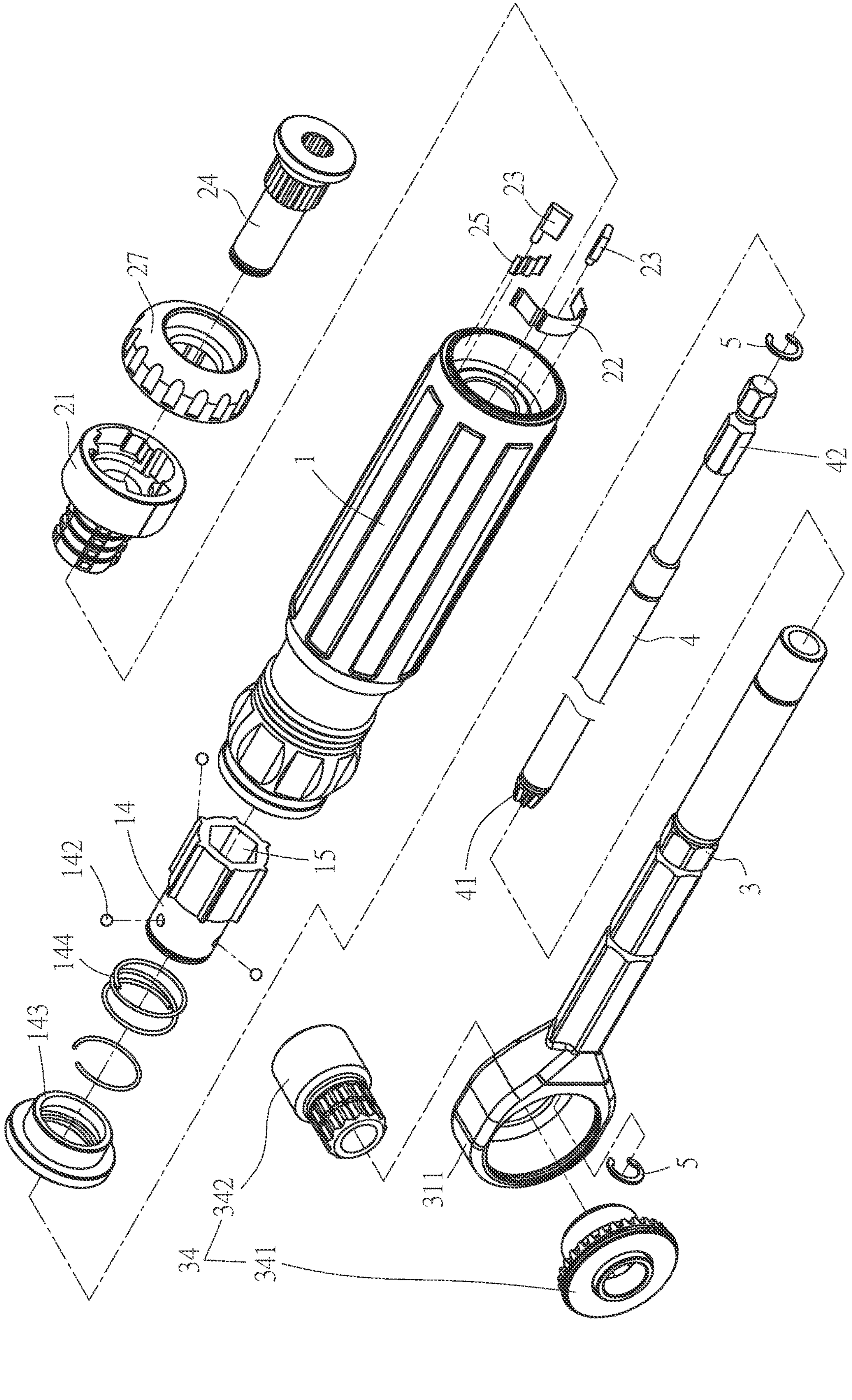
FIG. 1 is an exploded view of an embodiment of the present invention.
Figure 2:
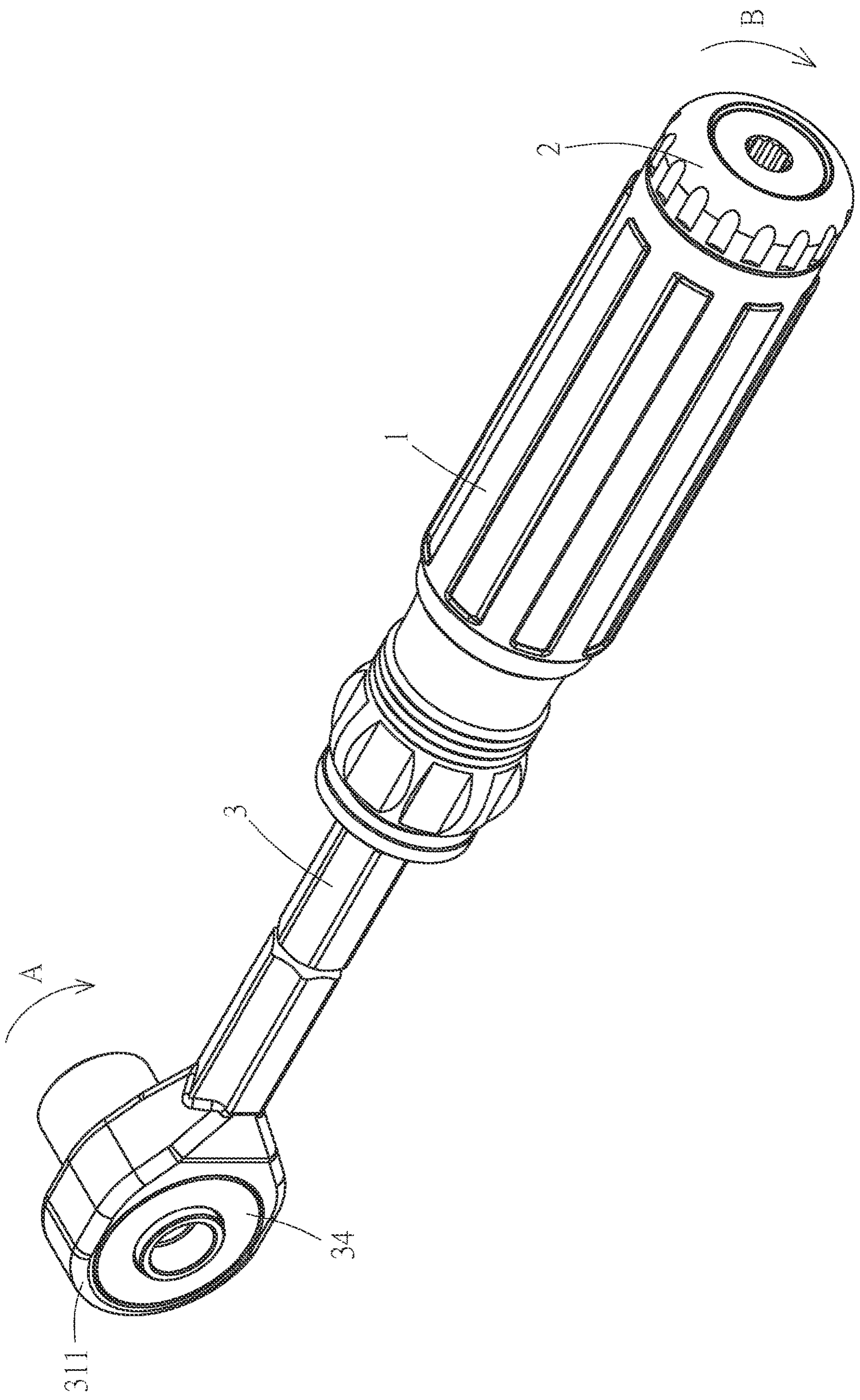
FIG. 2 is a schematic view showing the operation of the wrench of the embodiment of the present invention.
Figure 3:
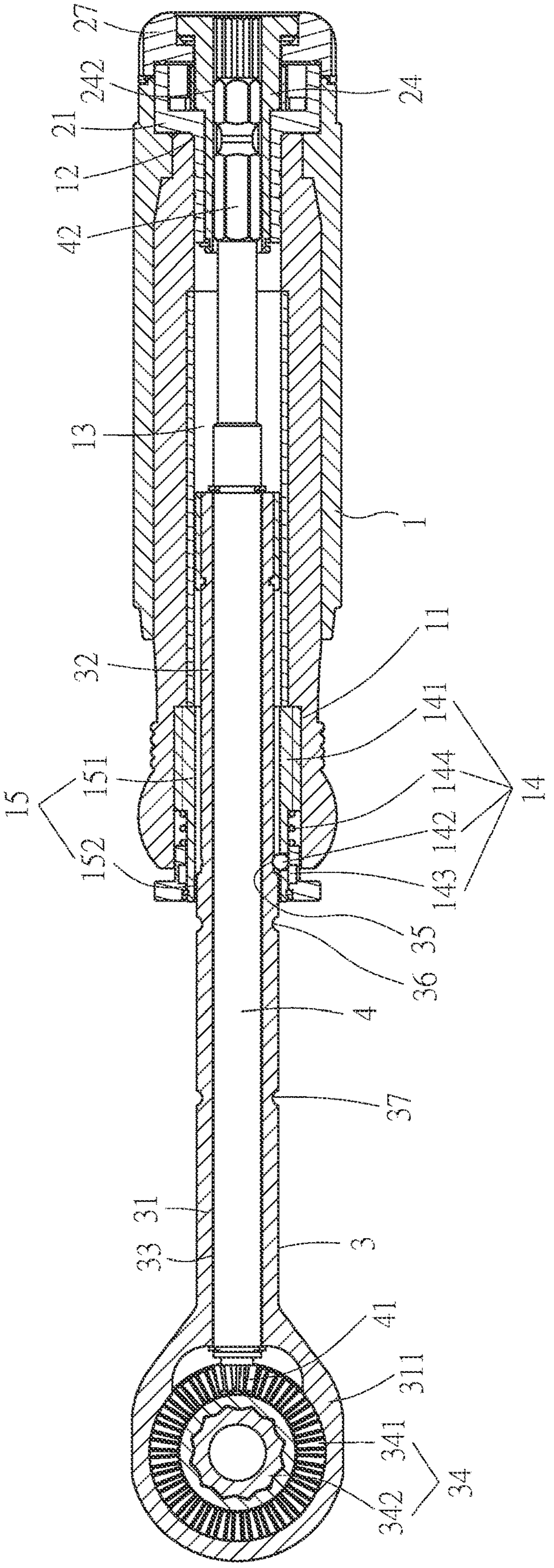
FIG. 3 is a schematic view of the embodiment of the present invention, wherein the positioning member is engaged with the first positioning portion.

Referring to FIGS. 1-3, the present invention discloses a ratchet wrench, comprising a grip 1, a rod member 3, and a shaft 4. The grip 1 is in the form of a hollow cylinder, and has a non-slip structure formed by a plurality of ribs on its outer surface. Two ends of the grip 1 have openings defined as a first opening 11 and a second opening 12, respectively. An accommodation space 13 is defined between the first opening 11 and the second opening 12 to communicate with the first opening 11 and the second opening 12. An adjustment structure 14 is connected to the first opening 11. The adjustment structure 14 includes a positioning seat 141, a positioning member 142, an adjustment member 143, and a return member 144. The center of the positioning seat 141 has a positioning hole 15. The positioning hole 15 includes a polygonal hole 151 and a cylindrical hole 152 communicating with the polygonal hole 151. In this embodiment, the polygonal hole 151 is a hexagonal through hole, and the cylindrical hole 152 is a circular through hole.

The rod member 3 is an independent rod mounted in the first opening 11 of the grip 1. The rod member 3 includes a polygonal rod section 31 and a cylindrical rod section 32. In this embodiment, the polygonal rod section 31 is a hexagonal rod section. A through hole 33 is defined in the rod member 3. An annular body 311 is connected to the polygonal rod section 31. A wrench 34 is connected to the annular body 311. The wrench 34 includes a toothed disk 341 and a sleeve 342 connected to the toothed disk 341. The wrench 34 is rotatable relative to the annular body 311. The surface of the cylindrical rod section 32 has a first positioning portion 35 in the form of an annular groove. The surface of the polygonal rod section 31 has a second positioning portion 36 in the form of an annular groove and a third positioning portion 37 in the form of an annular groove.

Figure 7:
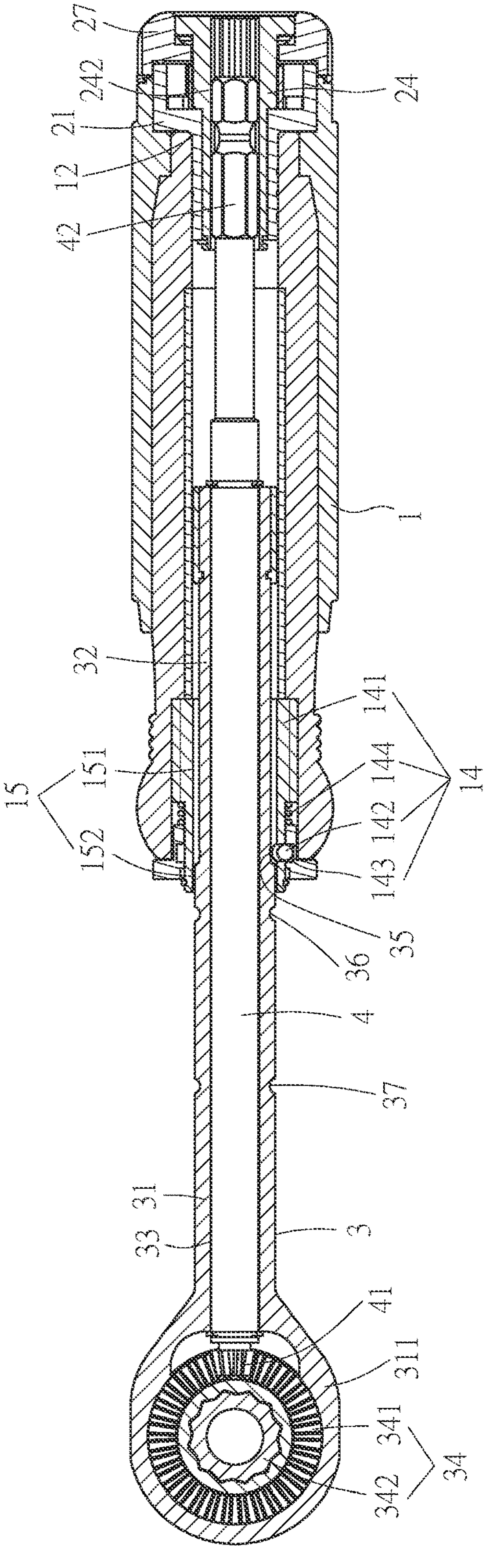
FIG. 7 is a first schematic view of the embodiment of the present invention, wherein the adjustment member is not pressed against the positioning member.

Please refer to FIG. 3 and FIG. 7. In the adjustment structure 14 shown in FIG. 3, the positioning member 142 and the return member 144 are located between the positioning seat 141 and the adjustment member 143. In this embodiment, the positioning member 142 is a steel ball, and the return member 144 is a spring. At this time, the positioning seat 141 and the adjustment member 143 restrict the movement of the positioning member 142, so that the positioning member 142 is engaged with the first positioning portion 35. As shown in FIG. 7, after the adjustment member 143 is pressed in the direction of the positioning seat 141, the positioning seat 141 and the adjustment member 143 will not restrict the movement of the positioning member 142. At this time, the positioning member 142 can be temporarily disengaged from the first positioning portion 35, so that the relative position of the grip 1 and the rod member 3 can be adjusted. When the force applying to the adjustment member 143 is released, the return member 144 will push the adjustment member 143 back to the original position, so that the positioning member 142 will return to be engaged with the first positioning portion 35. The positioning member 142 is selectively engaged with the first positioning portion 35, the second positioning portion 36 or the third positioning portion 37. As shown in FIG. 3, the positioning member 142 is engaged with the first positioning portion 35 as an example.

Referring to FIGS. 1-3, the shaft 4 is disposed in the through hole 33, and is combined with the rod member 3 through a retaining ring 5. The shaft 4 is rotatable relative to the rod member 3. One end of the shaft 4 is provided with a gear 41. The gear 41 is meshed with the toothed disk 341. Thereby, the rotation of the wrench 34 will drive the shaft 4 to rotate, and vice versa. The other end of the shaft 4 is provided with a coupling member 42. The coupling member 42 is in the form of a hexagonal prism and can be detachably connected to a ratchet structure 2.

When the positioning member 142 is engaged with the first positioning portion 35 and the grip 1 is rotated along a grip rotation direction B, the shaft 4 is driven to rotate, so as to drive the wrench 34 to rotate along a wrench rotation direction A. Thereby, it is suitable for use occasions in which it is inconvenient to swing the grip 1 greatly.

Figure 4:
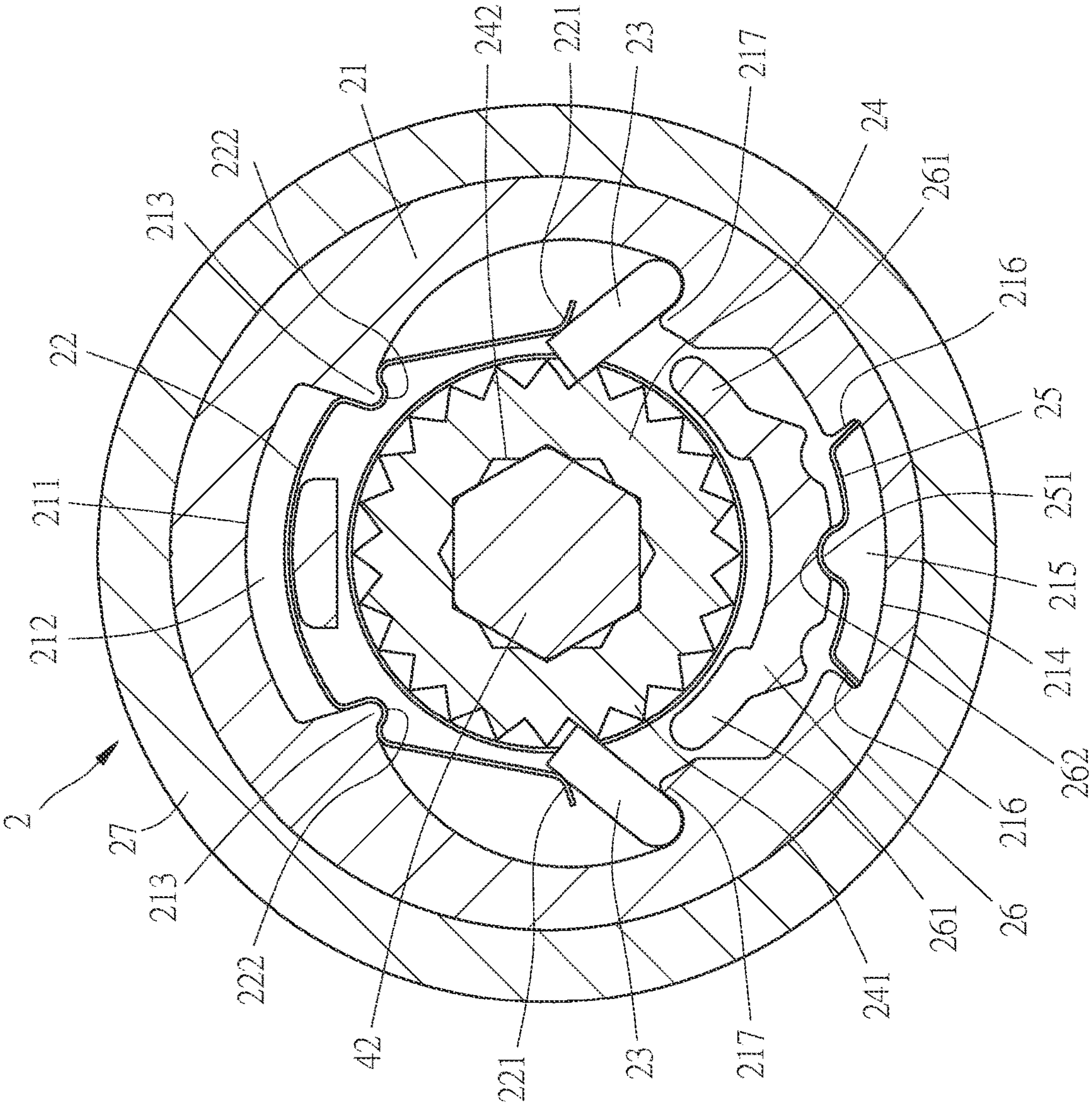
FIG. 4 is a cross-sectional view of the ratchet structure of the embodiment of the present invention.

FIG. 4 illustrates the structure of the ratchet structure 2 of the present invention. The ratchet structure 2 is mounted in the second opening 12 and includes a drive base 21. A first restricting portion 211, a second restricting portion 214 and two spaced blocking portions 217 are disposed on the inner wall of the drive seat 21.

A ratchet elastic plate 22 is disposed on the first restricting portion 211 of the accommodating space 13. The ratchet elastic plate 22 has two abutting portions 221 corresponding to the blocking portions 217. In this embodiment, the first restricting portion 211 includes a first recessed space 212 and two engaging blocks 213 on two side walls adjacent to the first recessed space 212. The ratchet elastic plate 22 has two engaging grooves 222 corresponding to the engaging blocks 213 on the two side walls, so as to secure the ratchet elastic plate 22 on the first restricting portion 211.

Two pawls 23 are disposed in the drive seat 21. One side of each pawl 23 is blocked by a corresponding one of the blocking portions 217, and the other side of each pawl 23 is abutted against a corresponding one of the abutting portions 221 of the ratchet elastic plate 22, so that each pawl 23 is positioned between the corresponding blocking portion 217 and the corresponding abutting portion 221.

A toothed shaft 24 passes through the drive seat 21. The toothed shaft 24 has a coupling hole 242. The coupling member 42 is detachably connected to the coupling hole 242. The toothed shaft 24 has a toothed portion 241 located between the two pawls 23.

A positioning elastic plate 25 is disposed on the second restricting portion 214 of the drive seat 21. The second restricting portion 214 includes a second recessed space 215 and two blocking walls 216 adjacent to the second recessed space 215. The positioning elastic plate 25 is placed in the second recessed space 215. Two ends of the positioning elastic plate 25 abut against the two blocking walls 216, respectively. The positioning elastic plate 25 has an operating portion 251. In this embodiment, the operating portion 251 is a protrusion.

A ratchet direction adjusting member 26 is coupled to a rotary cover 27. The ratchet direction adjusting member 26 has two contact portions 261 corresponding to the respective pawls 23. The ratchet direction adjusting member 26 has an operated portion 262 corresponding to the operating portion 251 of the positioning elastic plate 25. The operated portion 262 is three notches that are arranged side by side and correspond to the operating portion 251.

Figure 5:
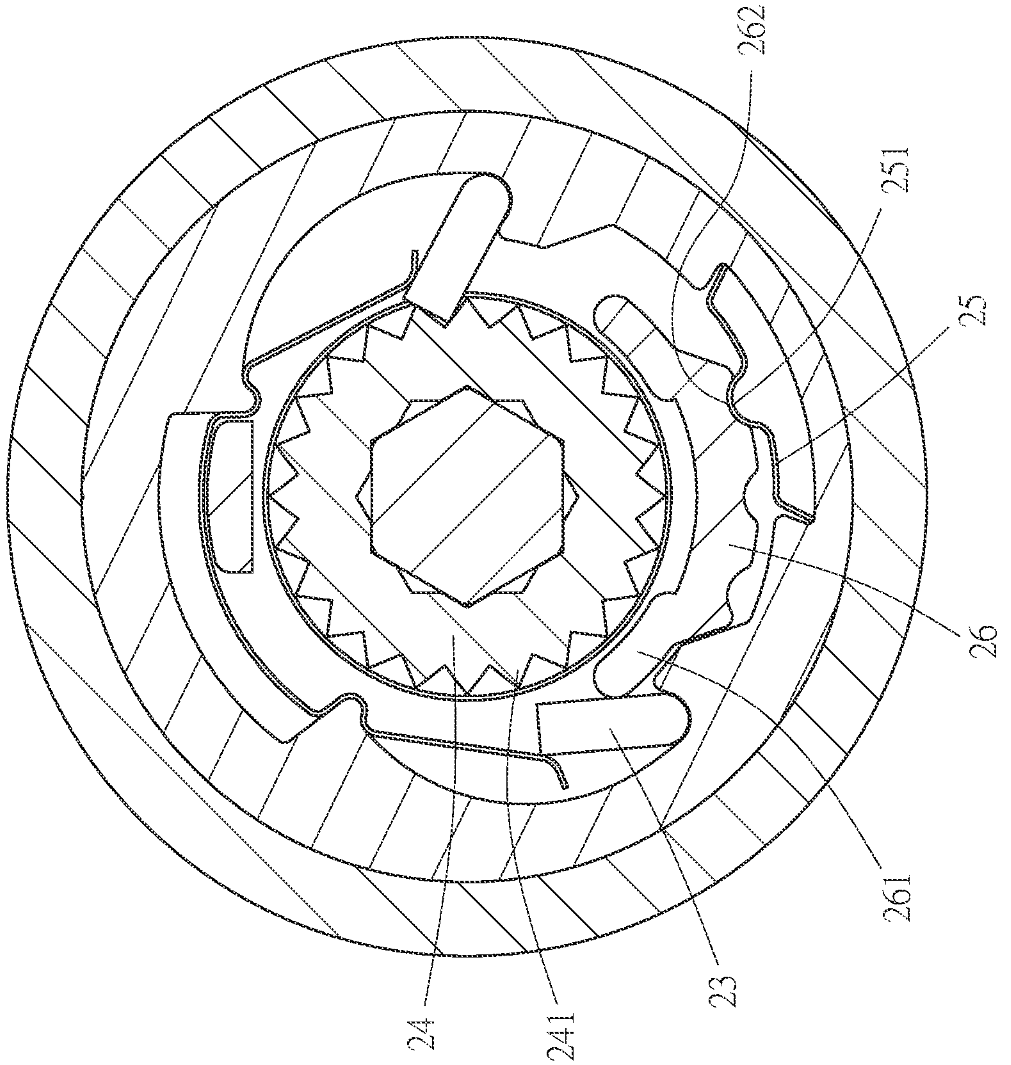
FIG. 5 is a first schematic view showing the operation of the ratchet structure of the embodiment of the present invention.
Figure 6:
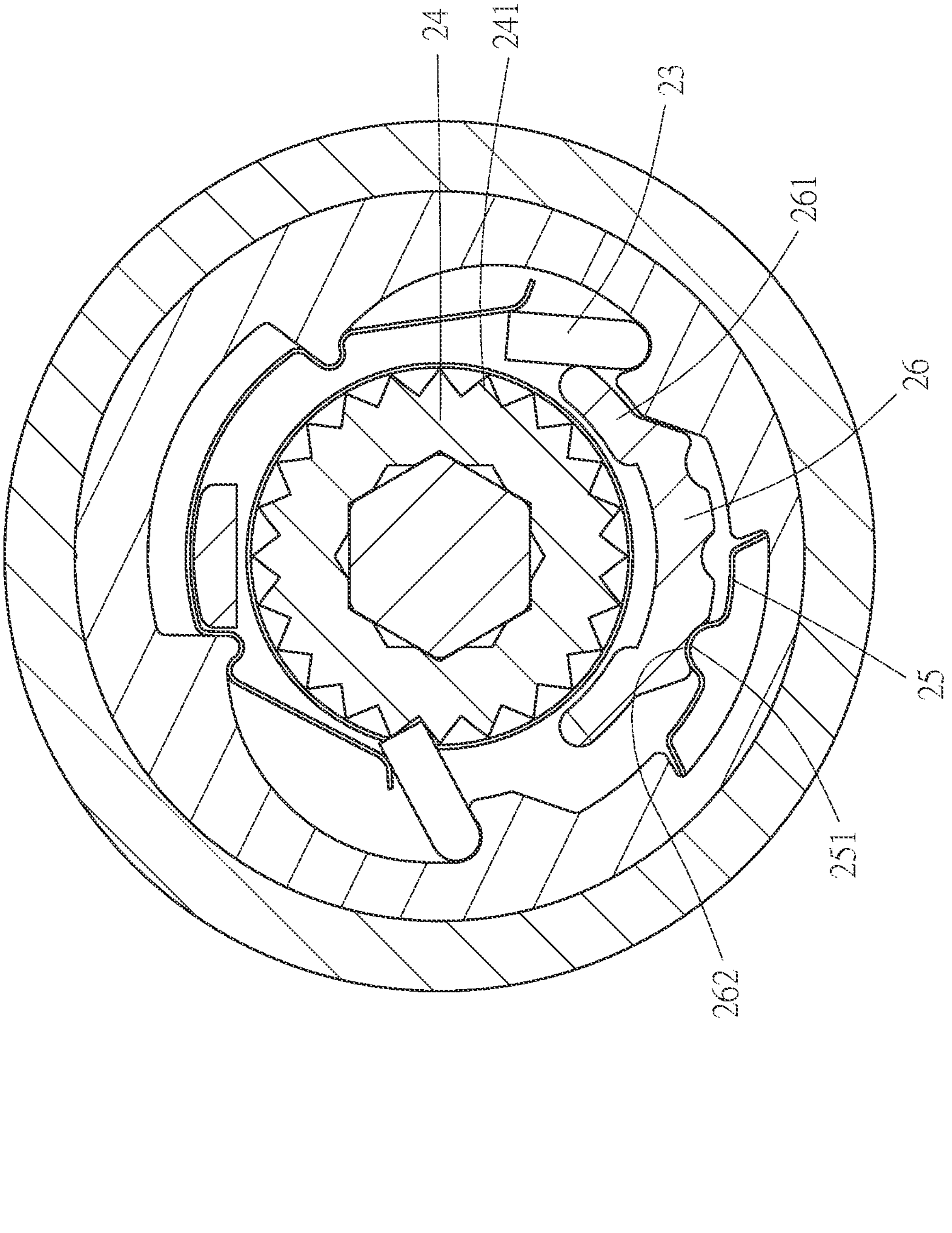
FIG. 6 is a second schematic view showing the operation of the ratchet structure of the embodiment of the present invention.

FIG. 5 and FIG. 6 illustrate the operation of the ratchet structure 2 of the present invention. According to the tool to be operated, such as the rotation direction of the ratchet wrench, the operating portion 251 of the positioning elastic plate 25 is configured to operate the operated portion 262 of the ratchet direction adjusting member 26. One of the contact portions 261 is in contact with a corresponding one of the pawls 23, and the corresponding pawl 23 operated by the contact portion 261 is not meshed with the toothed portion 241 of the toothed shaft 24, so as to adjust the rotation direction of the toothed shaft 24.

For example, when the operating portion 251 in the form of a protrusion is operated to the left notch of the operated portion 262, because the toothed portion 241 of the toothed shaft 24 is not restrained on the right side, the toothed portion 241 can be rotated clockwise. When the operating portion 251 in the form of a protrusion is operated to the right notch of the operated portion 262, because the toothed portion 241 of the toothed shaft 24 is not restrained on the leftside, the toothed portion 241 can be rotated counter-clockwise. Thereby, the toothed shaft 24 can be rotated clockwise/counterclockwise to drive a tool to be operated, such as a ratchet wrench to work.

Figure 8:
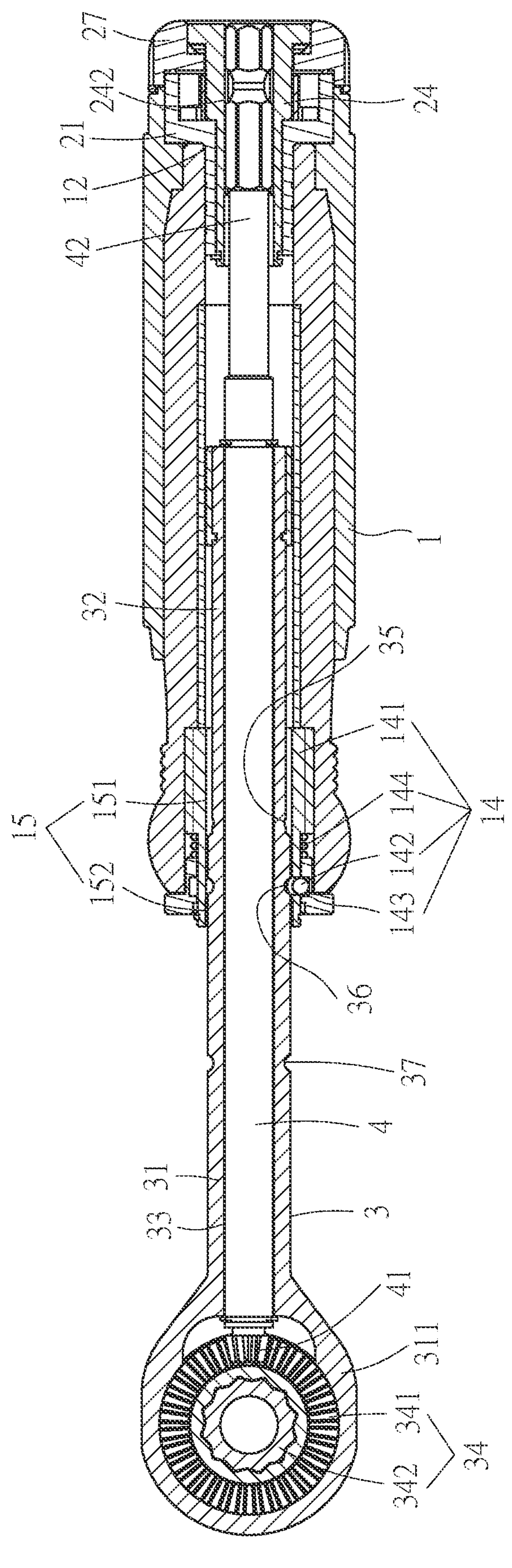
FIG. 8 is a second schematic view of the embodiment of the present invention, wherein the adjustment member is not pressed against the positioning member.
Figure 9:
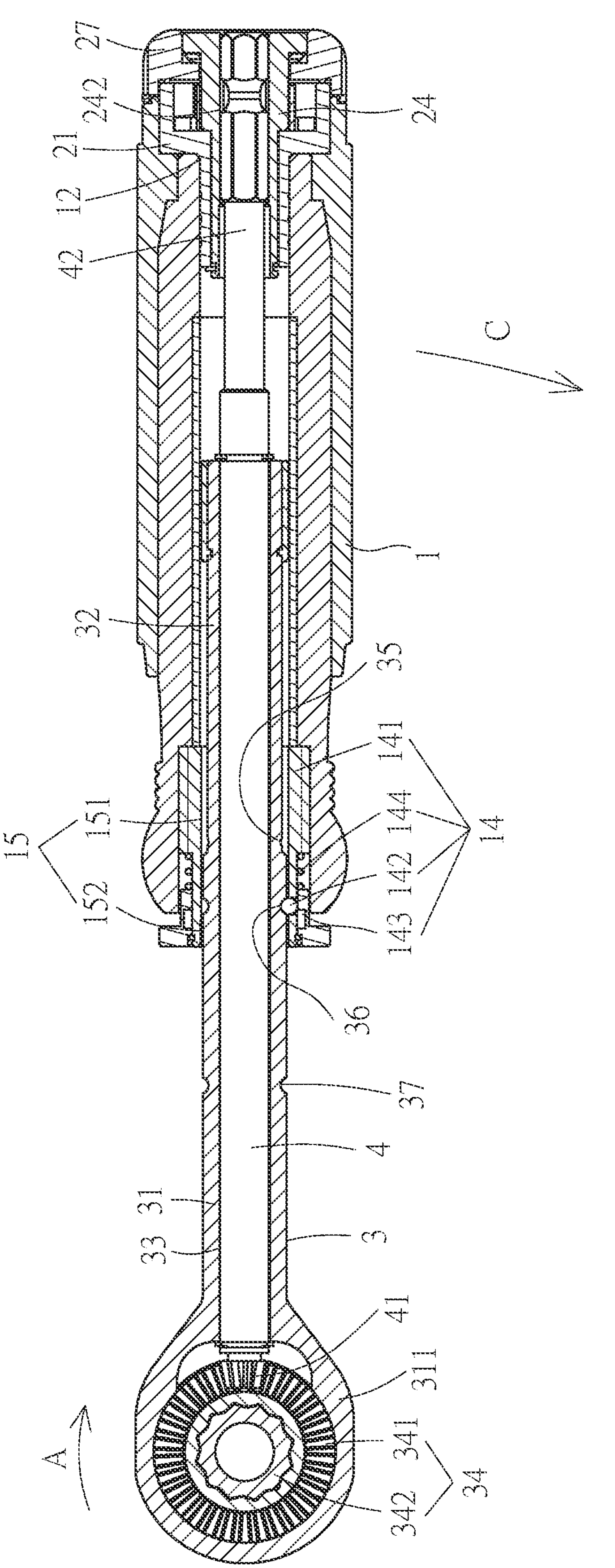
FIG. 9 is a schematic view of the embodiment of the present invention, wherein the positioning member is engaged with the second positioning portion.

FIG. 3 and FIGS. 7-9 illustrate the operation that the positioning member 142 engaged with the first positioning portion 35 is changed to be engaged with the second positioning portion 36. When the engaging position of the positioning member 142 is to be changed, the positioning member 142 can be temporarily disengaged from the first positioning portion 35 after the adjustment member 143 is pressed in the direction of the positioning seat 141 (as shown in FIG. 7). Next, the rod member 3 is displaced to move the second positioning portion 36 to the position aligned with the positioning member 142 (as shown in FIG. 8), and then the adjustment member 143 is released. The return member 144 pushes the adjustment member 143 back to the original position, so that the positioning member 142 is engaged with the second positioning portion 36 (as shown in FIG. 9).

When the positioning member 142 is engaged with the second positioning portion 36, the polygonal rod section 31 is engaged in the polygonal hole 151. The grip 1 and the rod member 3 are in a fixed state. At this time, the grip 1 can be moved along a grip swing direction C. In this way, the wrench 34 is driven to rotate along the wrench rotation direction A, so as to correspond to the use occasions where the wrench 34 needs to be rotated rapidly.

Figure 10:
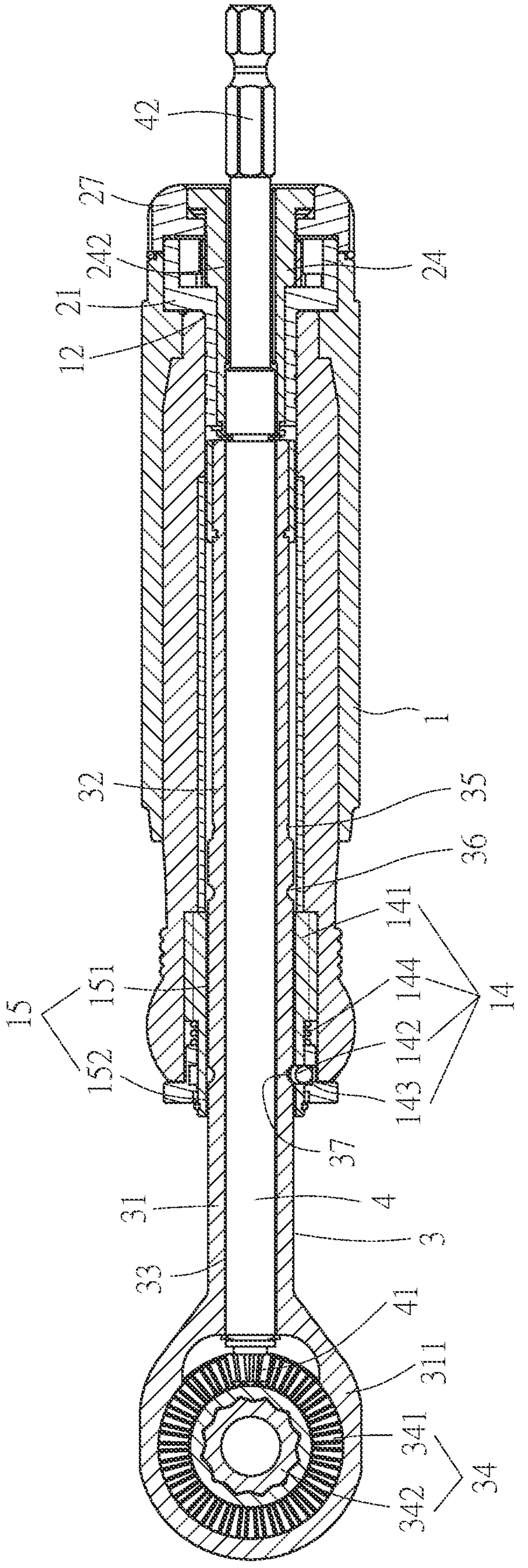
FIG. 10 is a third schematic view of the embodiment of the present invention, wherein the adjustment member is not pressed against the positioning member.
Figure 11:
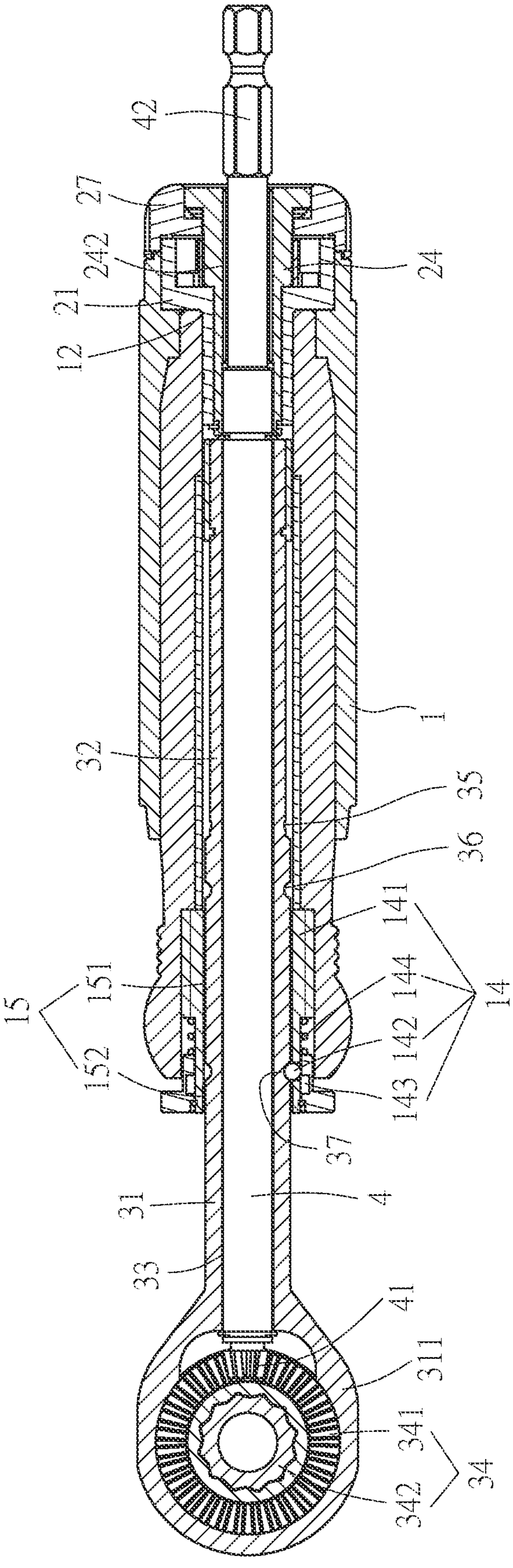
FIG. 11 is a schematic view of the embodiment of the present invention, wherein the positioning member is engaged with the third positioning portion.

FIG. 10 and FIG. 11 illustrate the operation that the positioning member 142 engaged with the second positioning portion 36 is changed to be engaged with the third positioning portion 37, which is similar to the operation that the positioning member 142 engaged with the first positioning portion 35 is changed to be engaged with the second positioning portion 36. The positioning member 142 can be temporarily disengaged from the second positioning portion 36 after the adjustment member 143 is pressed in the direction of the positioning seat 141. Next, the rod member 3 is displaced to move the third positioning portion 37 to the position aligned with the positioning member 142 (as shown in FIG. 10), and then the adjustment member 143 is released. The return member 144 pushes the adjustment member 143 back to the original position, so that the positioning member 142 is engaged with the third positioning portion 37 (as shown in FIG. 11). Similarly, when the positioning member 142 is engaged with the third positioning portion 37, the polygonal rod section 31 is engaged in the polygonal hole 151. The grip 1 and the rod member 3 are in a fixed state.

Figure 12:
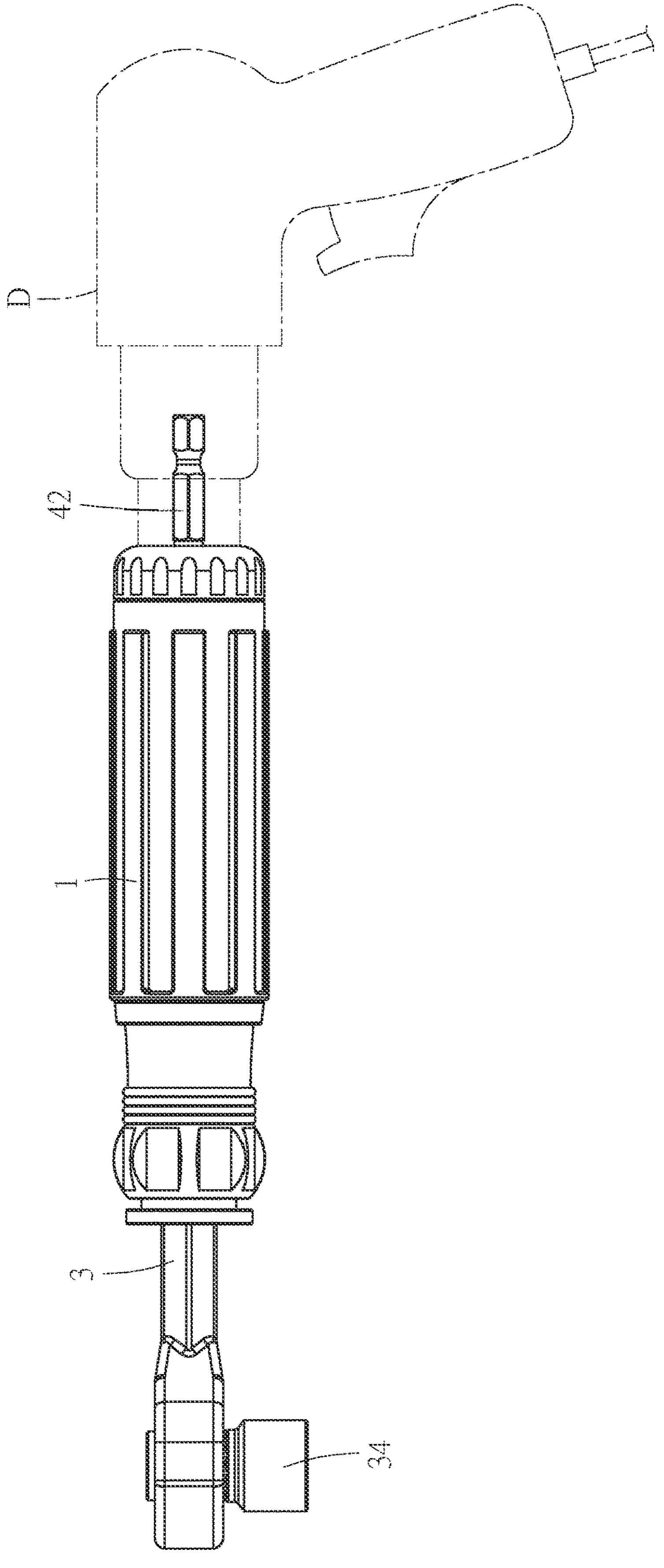
FIG. 12 is a schematic view illustrating that the coupling member is connected to the pneumatic tool when the positioning member is engaged with the third positioning portion.

FIG. 12 is a schematic view illustrating that the coupling member 42 is connected to a pneumatic tool D when the positioning member 142 is engaged with the third positioning portion 37. When the positioning member 142 is engaged with the third positioning portion 37, the coupling member 42 extends out of the ratchet structure 2 to facilitate the assembly of a pneumatic tool D and the coupling member 42. At this time, the shaft 4 can be driven to rotate by activating the pneumatic tool D, and then the wrench 34 can be rotated, so as to correspond to the use occasions where the wrench 34 is driven electrically. It is worth noting that the coupling member 42 is not connected to the coupling hole 242 at this time, so the rotation of the shaft 4 is not affected by the ratchet structure 2, referring to FIG. 2 and FIG. 4.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A ratchet wrench, comprising:

a grip, having a first opening, a second opening and an accommodation space, an adjustment structure being connected to the first opening, the adjustment structure including a positioning seat and a positioning member, the positioning seat having a positioning hole, the positioning hole including a polygonal hole and a cylindrical hole communicating with the polygonal hole, a ratchet structure being connected to the second opening;

a rod member, slidably disposed in the positioning hole, the rod member including a polygonal rod section and a cylindrical rod section, a through hole being defined in the rod member, an annular body being connected to the polygonal rod section, a wrench being connected to the annular body, the wrench being rotatable relative to the annular body, the cylindrical rod section having a first positioning portion, the polygonal rod section having a second positioning portion, the positioning member being selectively engaged with the first positioning portion or the second positioning portion to adjust a relative position of the grip and the rod member;

a shaft, disposed in the through hole, the shaft being rotatable relative to the rod member, one end of the shaft being provided with a gear, the gear being meshed with the wrench, another end of the shaft being provided with a coupling member, the coupling member being engaged with the ratchet structure.

2. The ratchet wrench as claimed in claim 1, wherein the ratchet structure includes:

a drive base, having a first restricting portion, a second restricting portion and two spaced blocking portions;

a ratchet elastic plate, having two abutting portions corresponding to the blocking portions;

two pawls, one side of each pawl being blocked by a corresponding one of the blocking portions, another side of each pawl being abutted against a corresponding one of the abutting portions, each pawl being positioned between the corresponding blocking portion and the corresponding abutting portion;

a toothed shaft, having a toothed portion and a coupling hole, the toothed portion being located between the two pawls; the toothed portion being selectively meshed with or not meshed with the two pawls, the coupling hole being configured to receive and secure the coupling member;

a positioning elastic plate, disposed in the drive seat, the positioning elastic plate having an operating portion;

a ratchet direction adjusting member, having two contact portions corresponding to the respective pawls, the ratchet direction adjusting member having an operated portion corresponding to the operating portion;

wherein the operated portion is driven by the operating portion for one of the contact portions to be in contact with a corresponding one of the pawls, and the corresponding pawl operated by the contact portion is not meshed with the toothed portion of the toothed shaft, so as to adjust a rotation direction of the toothed portion.

3. The ratchet wrench as claimed in claim 2, wherein the first restricting portion includes a first recessed space and two engaging blocks on two side walls adjacent to the first recessed space, and the ratchet elastic plate has two engaging grooves corresponding to the engaging blocks on the two side walls, so as to secure the ratchet elastic plate on the first restricting portion.

4. The ratchet wrench as claimed in claim 2, wherein the second restricting portion includes a second recessed space and two blocking walls adjacent to the second recessed space, the positioning elastic plate is placed in the second recessed space, and two ends of the positioning elastic plate abut against the two blocking walls, respectively.

5. The ratchet wrench as claimed in claim 2, wherein the ratchet direction adjusting member is coupled to a rotary cover.

6. The ratchet wrench as claimed in claim 2, wherein the operating portion of the positioning elastic plate is a protrusion, and the operated portion of the ratchet direction adjusting member is three notches arranged side by side.

7. The ratchet wrench as claimed in claim 1, wherein the polygonal rod section has a third positioning portion, the coupling member is detachably engaged with the ratchet structure, the positioning member is selectively engaged with the first positioning portion, the second positioning portion or the third positioning portion, when the positioning member is engaged with the third positioning portion, the coupling member is disengaged from the ratchet structure.

8. The ratchet wrench as claimed in claim 7, wherein the adjustment structure includes an adjustment member, the adjustment member controls the positioning member to be engaged with the first positioning portion, the second positioning portion or the third positioning portion.

9. The ratchet wrench as claimed in claim 1, wherein the wrench includes a toothed disk and a sleeve, the toothed disk is connected to the sleeve, and the toothed disk is meshed with the gear.

10. The ratchet wrench as claimed in claim 1, wherein the shaft is combined with the rod member through two retaining rings.

* * * * *